Nov. 4, 1958　　　J. HAEUSLER　　　2,858,635
SIGNAL ATTACHMENT FOR FISHING RODS AND POLES
Filed Sept. 28, 1955
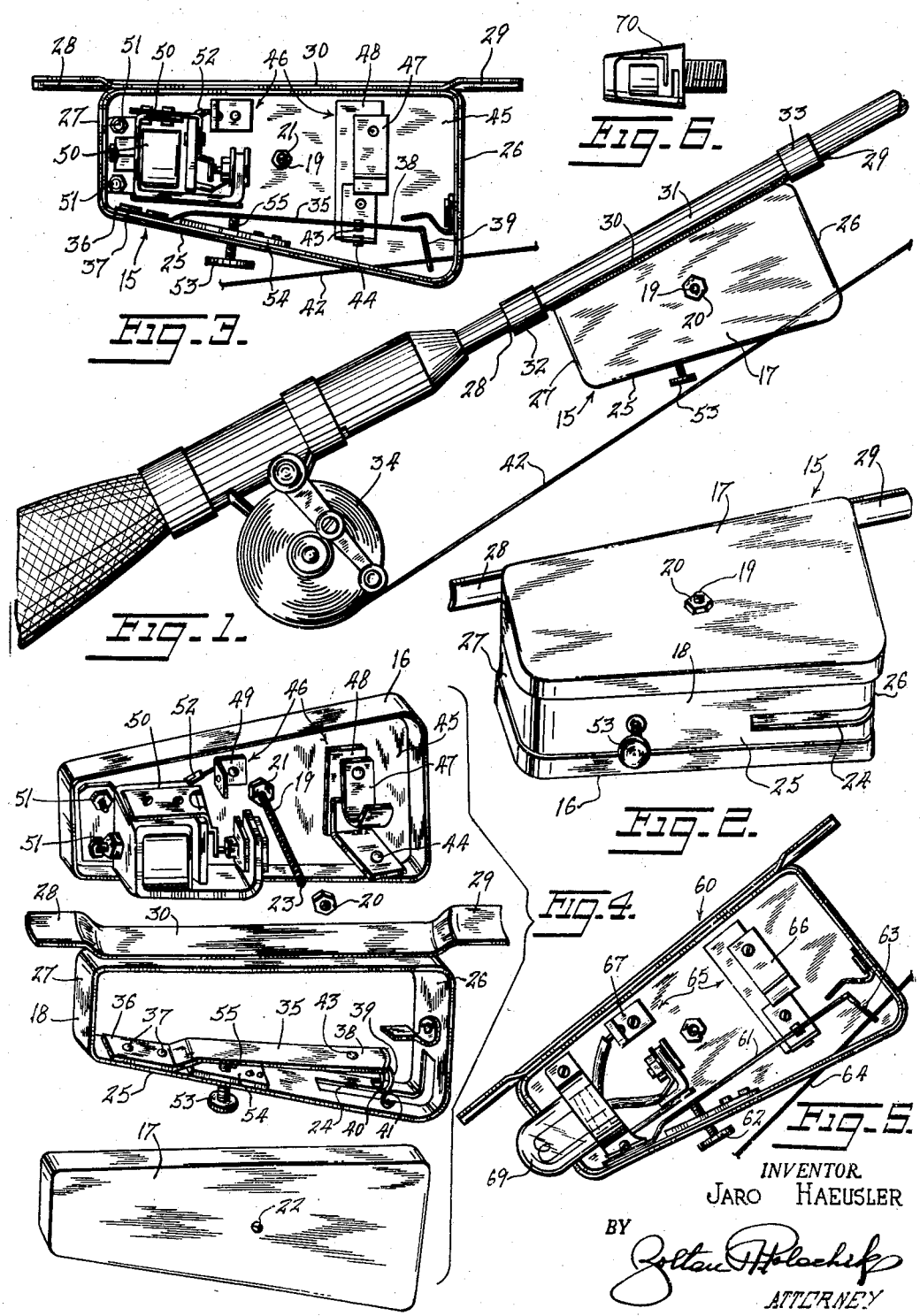
INVENTOR.
JARO HAEUSLER
BY
ATTORNEY

United States Patent Office 2,858,635
Patented Nov. 4, 1958

2,858,635

SIGNAL ATTACHMENT FOR FISHING RODS AND POLES

Jaro Haeusler, Union City, N. J.

Application September 28, 1955, Serial No. 537,089

1 Claim. (Cl. 43—17)

This invention relates to new and useful improvements in signal devices or attachments for fishing rods or poles.

More particularly, the present invention proposes the construction of an improved fishing rod signal device which can easily and quickly be attached to any fishing rod or pole and which will signal not only when a fish bites or is hooked but which can also be adjusted to indicate when a fish is in the immediate vicinity of the fishhook.

As a further object, the present invention proposes forming the device with a spring signal lever and adjustment means for the lever conveniently located outside the casing of the device so that the signal means can be made as sensitive as desired.

Another object of the present invention proposes constructing a device which can readily be made either with an audible signal means for daytime fishing or with a visible signal means for night and darkness or semi-darkness fishing.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side view of a fishing rod and of a signal device constructed and arranged in accordance with the present invention.

Fig. 2 is a perspective view of the signal device shown in Fig. 1.

Fig. 3 is a side view of the device with one side of the casing removed.

Fig. 4 is an exploded perspective view of the device.

Fig. 5 is a view similar to Fig. 3 but illustrating a modification of the present invention.

Fig. 6 is a buzzer for insertion in the socket shown in Fig. 5 in place of the lamp.

The signal device for fishing rods, in accordance with the first form of the invention illustrated in Figs. 1 to 4, inclusive, has a casing 15 having two sides 16 and 17 and a hollow center section 18, the sides being held together by a bolt 19 and nut 20. Bolt 19 is secured to side 16 by nut 21 and side 17 of the casing has a bolt opening 22 to permit the end 23 of the bolt 19 to extend through to receive the nut 20. A line opening 24 is provided in the bottom 25 of the casing in the hollow center section 18. The casing 15 is somewhat tapered in shape having a longer front portion 26 than rear portion 27. Extensions 28 and 29 are secured to the upper surface 30 of the casing to fit around a fishing rod 31 and removably to hold the casing to the rod while slide rings 32 and 33 on the rod are slid over the extensions 28 and 29. The casing fits on the rod 31 beneath the rod and between the reel 34 and the free end of the rod.

A spring signal lever 35 has one end 36 fixed to the casing center section 18 inside the casing by rivets 37 and a free end 38 aligned with and extending over the line opening 24 in the casing. A horseshoe-shaped spring clamp 39 is fixed to the free end 38 of the lever 35, said spring clamp being formed with spaced side portions 40 and 41 which frictionally engage a fishing line passed therethrough. The fishing line 42 extends through the line opening 24 in the casing and the clamp 39 removably holds the line 42. An electrical contact 43 is provided on the spring signal lever 35 adjacent to and spaced from the free end 38 of the lever.

Fixed electrical contact 44 is mounted in the casing on an insulated plate 45 and beneath the spring signal lever 35 and aligned with the electrical contact 43 on lever 35.

Also mounted on insulated plate 45 is a battery clip 46 having one terminal 47 connected with the fixed electrical contact 44 by a conductor strip 48 and a second terminal 49 spaced from contact 44.

A buzzer 50 is mounted on the insulator plate 45 in the casing and secured to the casing by bolts 51. A wire 52 connects the buzzer 50 to the second terminal 49 of battery clip 46. The buzzer is also connected electrically with the spring signal lever contact 43 so that the buzzer is energized when the contact 43 closes against fixed contact 44.

An adjustment screw 53 extends through the casing center section 18 at the bottom of the casing and through an insulator strip 54 fixed to the casing center section 18 inside the casing. The adjustment screw has an upper end 55 which bears against the spring signal lever 35 between the fixed end of the lever and its free end so as to adjust the distance between the fixed contact 44 and the contact 43 on the spring lever 35.

By adjustment of the thumb screw 53, the signal device can be made as sensitive as desired. It can, for instance, be made to operate the buzzer when a fish draws the line tight by contact with the hook or made sensitive enough to signal the presence of fish near the hook by movement of the line due to the pressure waves preceding a fish swimming to or near the hook.

The modification of the invention illustrated in Figs. 5 and 6 is characterized by the provision of a casing 60 having a spring signal lever 61, adjustment screw 62, line holding clamp 63 for fishing line 64, battery clip 65 with terminals 66 and 67 and a socket for a signal lamp 69 or buzzer 70.

The signal lamp 69 can be screwed into the socket when night or darkness or semi-darkness fishing is engaged in and the buzzer 70 can be inserted when audible signals are desired.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A signal device for fishing rods comprising a flat elongated casing having a pair of extensions at an upper side thereof, said extensions being a means whereby the casing may be removably secured to a pair of slip rings on a fishing rod beneath the rod and between a reel and the free end of the rod, said casing having a slotted line opening for a fishing line to extend through the casing, a flat spring signal lever fixed at one end inside the casing and having a free end in the casing aligned with an extending over the line opening in the casing, a horseshoe-shaped spring clamp with closely spaced side portions on the free end of the spring signal lever removably to hold a fishing line extending through the casing line opening, an electrical contact on the spring signal lever, a fixed electrical contact mounted in the casing beneath the spring signal lever and aligned with the electrical contact on said lever, a battery clip having one terminal connected with said fixed electrical contact and a second terminal spaced from said contact, an electrically operated signal means mounted in the casing, connecting means electrically to connect the second terminal of the battery clip and the electrical contact of the spring signal lever with said signal means, an adjustment screw extending through a side of the casing and connected with the spring signal lever between the fixed end of the lever and the free end thereof to adjust the distance between said fixed contact and the contact on the spring signal lever, and an insulated plate mounted in the casing for mounting the signal means and battery clip thereof, said spring signal lever and said fixed contact being so disposed that movement of the contact on the spring signal lever against the fixed contact closes the circuit only when the fishing line is drawn taut by the bite of a fish or by vibrations in the water caused by the immediate proximity of a fish to the hook, said signal means being a socket secured in said casing for mounting an interchangeable lamp and buzzer.

References Cited in the file of this patent

UNITED STATES PATENTS

| | | |
|---|---|---|
| 522,352 | Poppowitsch | July 3, 1894 |
| 1,267,248 | Monighan | May 21, 1918 |
| 2,446,427 | Linder | Aug. 3, 1948 |
| 2,643,371 | Sleeger | June 23, 1953 |